March 1, 1955    H. S. HINCHMAN ET AL    2,703,211
CATAPULT FOR LAUNCHING AIRCRAFT Filed Oct. 30, 1951                                11 Sheets-Sheet 1

INVENTORS
HARVEY S. HINCHMAN
RAYMOND E. HAYS
BY
ATTORNEYS

March 1, 1955 — H. S. HINCHMAN ET AL — 2,703,211
CATAPULT FOR LAUNCHING AIRCRAFT
Filed Oct. 30, 1951 — 11 Sheets-Sheet 2

INVENTORS
HARVEY S. HINCHMAN
RAYMOND E. HAYS
BY
ATTORNEYS

March 1, 1955     H. S. HINCHMAN ET AL     2,703,211
CATAPULT FOR LAUNCHING AIRCRAFT
Filed Oct. 30, 1951     11 Sheets-Sheet 4

INVENTORS
HARVEY S. HINCHMAN
RAYMOND E. HAYS
BY
ATTORNEYS

INVENTORS
HARVEY S. HINCHMAN
RAYMOND E. HAYS
BY
ATTORNEYS

March 1, 1955    H. S. HINCHMAN ET AL    2,703,211
CATAPULT FOR LAUNCHING AIRCRAFT
Filed Oct. 30, 1951    11 Sheets-Sheet 11

INVENTORS
HARVEY S. HINCHMAN
RAYMOND E. HAYS
BY
ATTORNEYS

United States Patent Office 2,703,211
Patented Mar. 1, 1955

2,703,211

CATAPULT FOR LAUNCHING AIRCRAFT

Harvey S. Hinchman, Haddonfield, N. J., and
Raymond E. Hays, Philadelphia, Pa.

Application October 30, 1951, Serial No. 253,944

4 Claims. (Cl. 244—63)

(Granted under Title 35, U. S. Code (1952), sec. 266)

The invention described herein may be manufactured and used by or for the Government of the United States of America for governmental purposes without the payment of any royalties thereon or therefor.

This invention relates to a catapult device adapted to build up sufficient velocity to launch a plane or an object into space.

There is used a slotted cylinder having a piston adapted to reciprocate therein and a shuttle outside of the cylinder connected to the piston by a web adapted to reciprocate in the slot. The piston is moved by means of fluid pressure.

In order for energy to be built up and maintained behind the piston there is provided a closure for the slot in the cylinder and this closure comprises a sealing strip. Normally the sealing strip rests in the bottom of the cylinder but under operating conditions, as the piston advances in the cylinder, guide means on the piston pick up the sealing strip from the bottom of the cylinder and locate it at the top in sealing position at the slot behind the piston. The sealing strip is maintained in sealing position by the fluid pressure that reciprocates the piston.

The object of this invention is to provide a catapult device comprising a slotted cylinder having a piston adapted to reciprocate therein and a shuttle outside of the cylinder and connected to the piston by a web adapted to reciprocate in the slot, together with a sealing strip normally resting in the bottom of the cylinder but guided under operating conditions, by advance of the shuttle, into the top of the cylinder and located in sealing relation to the slot, the sealing strip being maintained in sealing position by the fluid pressure that reciprocates the piston.

Other objects and many of the attendant advantages of this invention will be readily appreciated as the same becomes better understood by reference to the following detailed description when considered in connection with the accompanying drawings wherein:

Fig. 5 is a right end elevation of the launching engine installation shown in Figs. 3 and 4. Fig. 5 is on a slightly larger scale than Figs. 3 and 4.

Fig. 7 is a view taken substantially along line 7—7 of Fig. 6 showing the tubular liner and link assembly and the arrangement of vent holes. Fig. 7 is on a larger scale than Fig. 6.

Fig. 10 is a view taken substantially along line 10—10 of Fig. 6 showing the tubular liner and link assembly near the battery end of the slotted cylinder. Fig. 10 is on a larger scale than Fig. 6.

Fig. 11 is a view taken substantially along line 11—11 of Fig. 6 showing the tubular liner and link assembly at a joint of the slotted cylinder. Fig. 11 is on a larger scale than Fig. 6.

Fig. 15 is an end elevation of the shuttle and piston assembly as viewed from the left side of Fig. 14. Fig. 15 is on a smaller scale than Fig. 14.

Fig. 16 is a fragmentary view taken substantially along line 16—16 of Fig. 14 showing the guiding means for lifting the sealing strip from the bottom of the slotted tube to the top thereof. Fig. 16 is on a larger scale than Fig. 14.

Fig. 17 is a fragmentary view of the left end of the shuttle shown in Fig. 14. Fig. 17 is on a larger scale than Fig. 14.

Fig. 20 is a view showing the cleat and hook assembly of Fig. 19. Fig. 20 is on a larger scale than Fig. 19.

Launching engine cylinder

Figure 1:
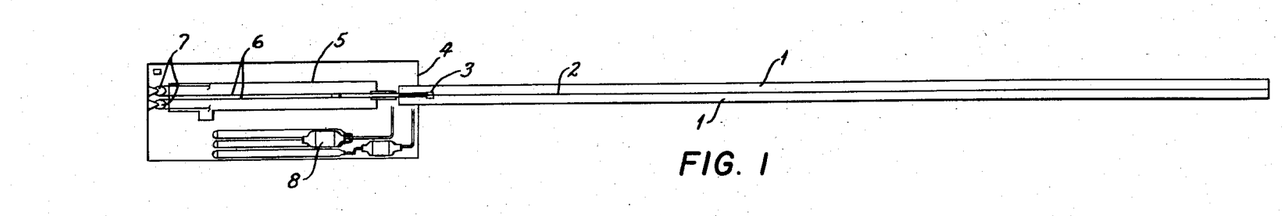
Fig. 1 is a diagrammatic top view of the catapult installation.
Figure 2:
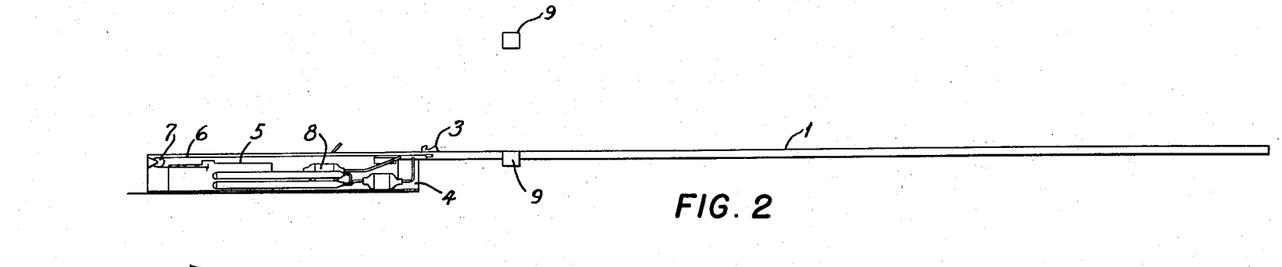
Fig. 2 is a side view of the catapult installation seen in Fig. 1.

There are shown in Figs. 1 and 2 diagrammatic top and side views of the catapult installation. Deck plates 1 define a catapulting path and are disposed flush with the flight deck of an aircraft carrier or flush with the ground surface of a shore installation. Opening 2 between plates 1 permits travel, along the catapulting path, of hook 3 that forms part of the launching engine 13 (Fig. 4) located below deck plates 1. At the battery end of plates 1 is a brake pit 4 accommodating brake engine 5 connected to hook 3 by cables 6 passing around sheaves 7. Also accommodated in brake pit 4 are air flasks and accumulators 8 for operating the brake engine 5. A control pit 9 is shown in a location remote from brake pit 5.

Figure 6:
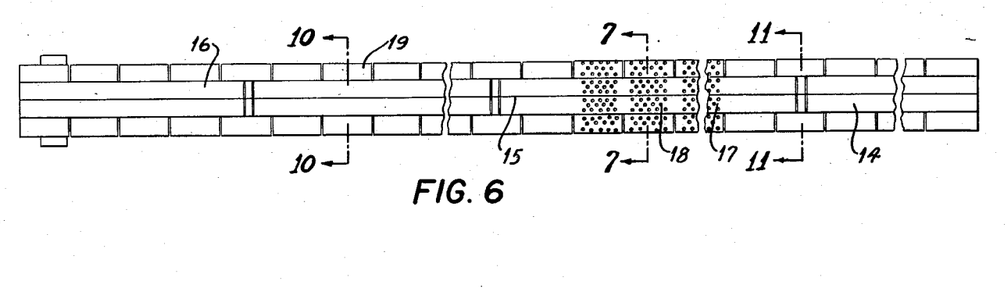
Fig. 6 is a diagrammatic view showing the arrangement of the tubular liner and link assembly that comprises the slotted cylinder of the launching engine.

The launching engine 13 (Figs. 3, 4) includes a cylinder 14 having a longitudinal slot 15 in the top thereof throughout its length. Because of its great length cylinder 14 is formed from individual sections 16, 17 (Fig. 6) that are of uniform cross section. Cylinder section 16 forms an impervious shell capable of confining gas under high pressure, when slot 15 is sealed, whereas sections 17 are provided with numerous vent holes 18 to permit gas to escape therefrom at the end of the power portion of the catapulting operation.

Figure 8:
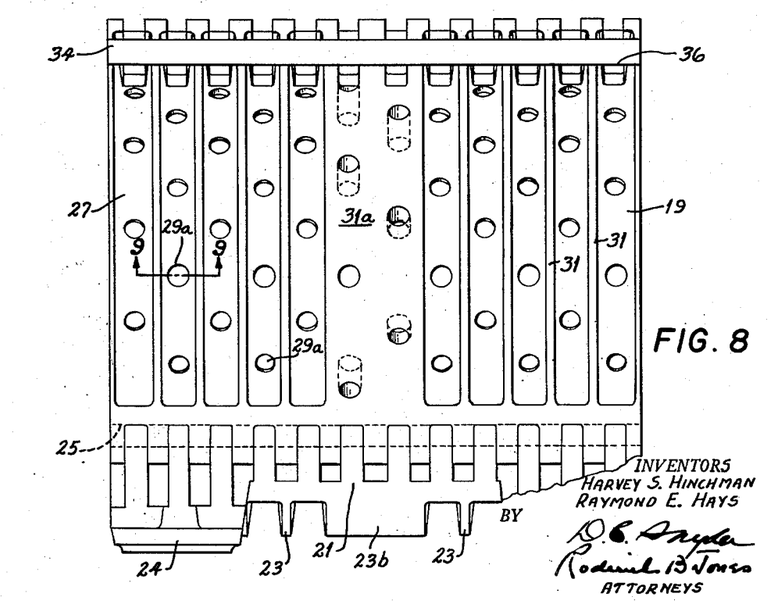
Fig. 8 is a side elevation of the tubular liner and link assembly viewed from the left of Fig. 7.
Figure 9:
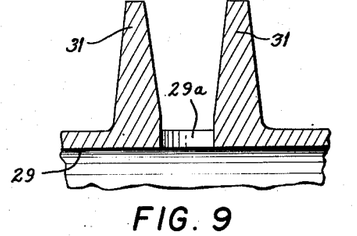
Fig. 9 is an enlarged fragmentary detail at one of the vent holes taken substantially along line 9—9 of Fig. 8.
Figure 10:
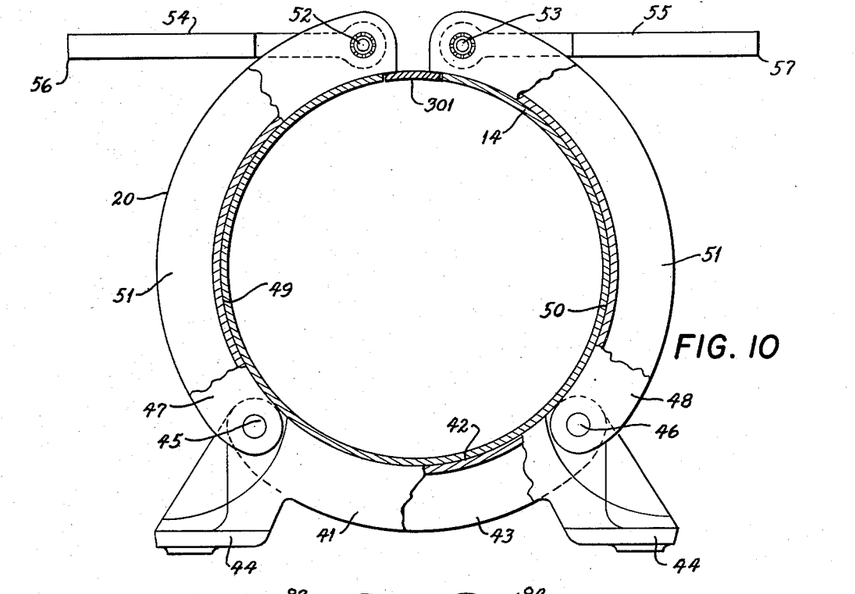

Cylinder sections 16, 17 are braced against radial deformation by link assemblies 19 (Figs. 7, 8 and 9) and 20 (Fig. 10). Link assembly 19 has a concave base 21 forming a seat 22 having the same contour as the outside of cylinder 14. Seat 22 is reinforced by radially-extending longitudinally-spaced fins 23, the central fin 23b being of extra longitudinal width. Extending through seat 22 and opening into the space between fins 23 are vent holes 23a. Base 21 has feet 24 adapted for bolting to suitable substructure (Fig. 5).

Figure 7:
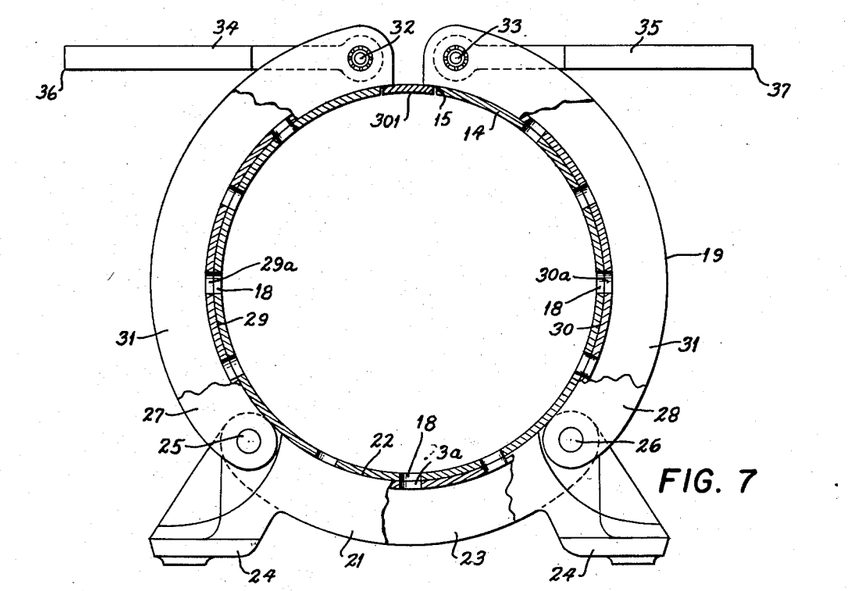

Extending the length of base 21 on opposite sides thereof are hinge pins 25, 26 on which are hinged opposed concave arms 27, 28 providing seats 29, 30 having the same contour as the outside of cylinder 14. Seats 29, 30 are each reinforced by radially-extending longitudinally-spaced fins 31, similar to base fins 23. The central fin 31a is of extra longitudinal width. Extending through seats 29, 30 and opening into the space between fins 31 are vent holes 29a, 30a, similar to base holes 23a. With arms 27, 28 closed toward each other, link assembly 19 forms a cylindrical seat for cylinder 14 as seen in Fig. 7.

Figure 5:
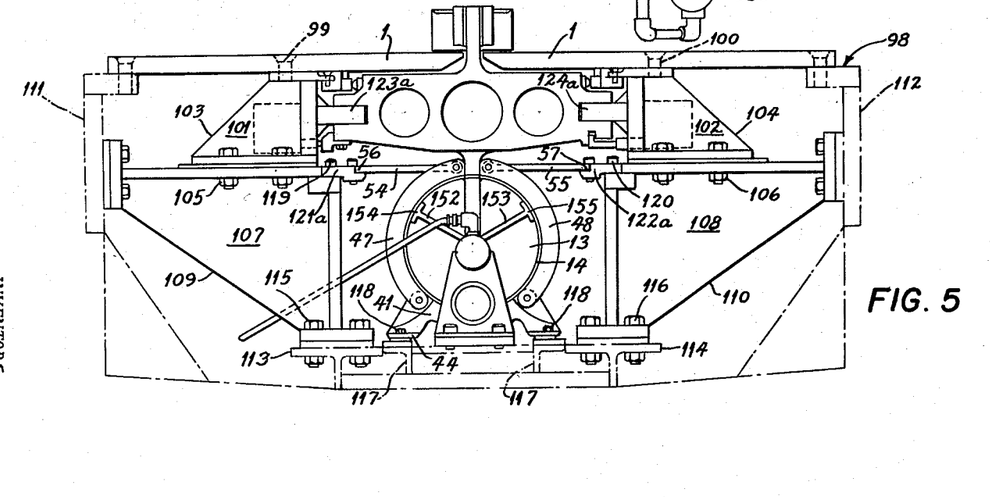

At the upper extremity of arms 27, 28, and extending the length thereof are hinge pins 32, 33 on which are hinged links 34, 35 extending horizontally away from each other and terminating in thrust cheeks 36, 37 adapted for seating in appropriate substructure (Fig. 5). Link assemblies 19 are designed for bracing cylinder sections 17. Vent holes 18 of cylinder sections 17 are in registration with vent holes 23a, 29a and 30a of link assemblies 19 to permit escape of gas from the interior of cylinder sections 17 to the exterior of link assemblies 19 at the end of the power portion of the catapulting operation.

Each link assembly 20 (Fig. 10) has a concave base 41 forming a seat 42 having the same contour as the outside of cylinder 14. Seat 42 is reinforced by radially-extending longitudinally-spaced fins 43, the central one of which (not shown) is of extra longitudinal width similar to base central fin 23b of Fig. 8. Base 41 has feet 44 adapted for bolting to appropriate substructure (Fig. 5). Extending the length of base 41 on opposite sides thereof are hinge pins 45, 46 on which are hinged opposed concave arms 47, 48 providing seats 49, 50 having the same contour as the outside of cylinder 14. Seats 49, 50 are each reinforced by radially-extending, longitudinally-spaced fins 51. The central fin (not shown) of each arm 47, 48 is of extra longitudinal width similar to arm central fins 31a of Fig. 8. With arms 47, 48 closed toward each other, each link assembly 20 forms a cylindrical seat for cylinder 14.

At the upper extremity of arms 47, 48 and extending the length thereof are hinge pins 52, 53 on which are hinged links 54, 55 extending horizontally away from each other and terminating in thrust cheeks 56, 57 adapted for seating in appropriate substructure. Link assemblies 20 are designed for bracing cylinder sections 16 that form an impervious shell capable of confining gas under high pressure when slot 15 is sealed.

Figure 11:
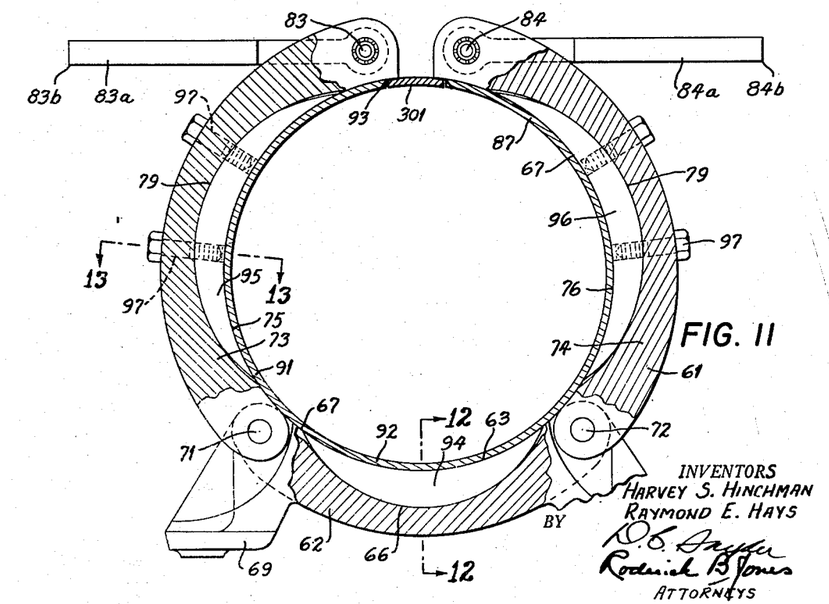
Figure 12:
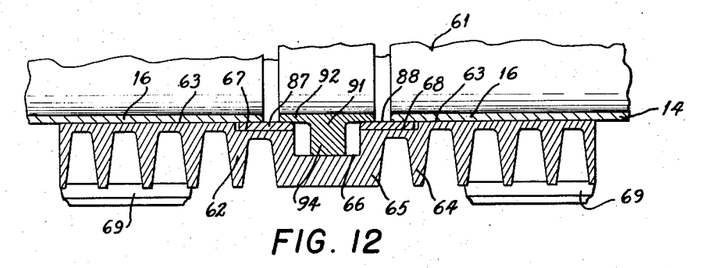
Fig. 12 is a fragmentary detail taken substantially along line 12—12 of Fig. 11.

Link assemblies 61 (Figs. 11, 12, 13) of special construction are provided at the joints between adjacent sections of cylinder 14 for bracing cylinder 14 against radial deformation and for anchoring the sections of cylinder 14 against axial displacement. Each link assembly 61 has a concave base 62 forming a seat 63 having the same contour as the outside of cylinder 14. Seat 63 is reinforced by radially-extending, longitudinally-spaced fins 64 (Fig. 12), the central one 65 of which is of extra longitudinal width. Seat 63 centrally thereof is provided with a crescent-shaped deep recess 66 that along opposite edges thereof expands longitudinally into shallow grooves 67, 68 of uniform depth. Base 62 has feet 69 adapted for bolting to appropriate substructure (Fig. 5). Extending the length of base 62 on opposite sides thereof are hinge pins 71, 72 on which are hinged opposed concave arms 73, 74 providing seats 75, 76 having the same contour as the outside of cylinder 14. Seats 75, 76 are each reinforced by radially-extending, longitudinally-spaced fins 77 (Fig. 13) similar to base fins 64. The central fin 78 is of extra longitudinal width. Each of seats 75, 76 centrally thereof is provided with a crescent-shaped deep recess 79 that along opposite edges thereof expands longitudinally into shallow grooves 81, 82 of uniform depth. Crescent-shaped recesses 66 and 79 are in registration with each other longitudinally of link assembly 61 and grooves 67, 68 and 81, 82 are in registration with each other longitudinally of link assembly 61. Base recess 66 is of greater longitudinal width than arm recesses 79, but the distance between the remote edges of grooves 67, 68 is the same as the distance between the remote edges of grooves 81, 82.

At the upper extremity of arms 73, 74 and extending the length thereof are hinge pins 83, 84 on which are hinge links 83a, 84a extending horizontally away from each other and terminating in thrust cheeks 83b, 84b, adapted for seating in appropriate substructure (Fig. 5).

Fastened about the extremities of adjacent cylinder sections, for example sections 16, 16 (Fig. 13), by means of rivets 85, 86 are cylinder catchpieces 87, 88 that extend beyond the cylinder sections a short distance to form lap joints therewith. Catchpieces 87, 88 each have a longitudinal slot (not shown) in the top thereof in alignment with slot 15 of cylinder 14. Catchpiece 87 nests in grooves 67, 81 with the extremity of its cylinder section 16 resting in seats 63, 75. Catchpiece 88 nests in grooves 68, 82 with the extremity of its cylinder section 16 resting in seats 63, 75.

Figure 13:
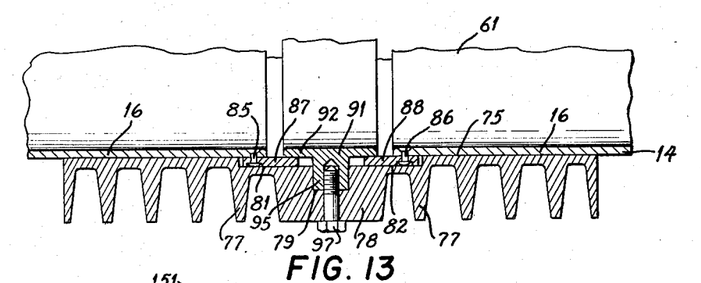
Fig. 13 is a fragmentary detail taken substantially along line 13—13 of Fig. 11.

Disposed between the extremities of adjacent cylinder sections, for example sections 16, 16, is a cylinder lockpiece 91 that has a longitudinal shell 92 of the same thickness as, and in alignment with, cylinder sections 16, 16. A longitudinal slot 93 is formed in the top of shell 92 in alignment with slot 15 of cylinder 14. Shell 92 overlaps the edges of catchpieces 87, 88. Integral with shell 92 and extending radially outward therefrom are three angularly-spaced crescent-shaped flanges 94, 95, 96 adapted to seat in base recess 66 and arm recesses 79, 79. Flanges 94, 95, 96 are each of a longitudinal width equal to arm recesses 79, 79 so that flanges 95, 96 nest snugly in recesses 79, 79, but flange 94 nests loosely on base recess 66. Lockpiece 91 is secured in place relative to arms 73, 74 by means of bolts 97, but lockpiece 91 is not bolted relative to base 62.

Disassembly of adjacent cylinder sections 16, 16 from link assembly 61 can be effected by removing bolts 97 from arms 73, 74 then raising links 83a, 84a to free thrust cheeks 83b, 84b. Arms 73, 74 are next opened away from each other to leave free crescent-shaped flanges 95, 96 of lockpiece 91. Finally lockpiece 91 is moved axially in one direction until flange 94 abuts a wall of recess 66 under which conditions shell 92 disengages catchpiece 87 or 88 so that the attached cylinder section 16 is free and can be uncradled from arms 73, 74. By moving lockpiece 91 axially in the opposite direction the other catchpiece 87 or 88 is disengaged to release its attached cylinder section 16.

In Fig. 5, is shown the emplacement 98 in which catapult engine 13 is mounted. Emplacement 98 comprises screws 99, 100 that secure deck plates 1 to reaction supports 101, 102 which include strengthening webs 103, 104. Reaction supports 101, 102 are connected by bolts 105, 106 to reaction supports 107, 108 which have strengthening webs 109, 110. Anchor members 111, 112 support the outboard edges of deck plates 1, 1. Pedestal members 113, 114 are secured to reaction supports 107, 108 by means of bolts 115 and 116. Another pedestal member 117 is fastened by means of bolts 118 to feet 44 of base 41. Fastened to the corners of reaction supports 107, 108 by means of bolts 119 and 120, are seat blocks 121a and 122a that accommodate cheeks 56, 57 of links 54, 55. Fastened to reaction supports 101, 102 and extending toward each other are rails 123a, 124a that form a launching track.

*Bridle tensioner and retraction buffer*

Figure 4:
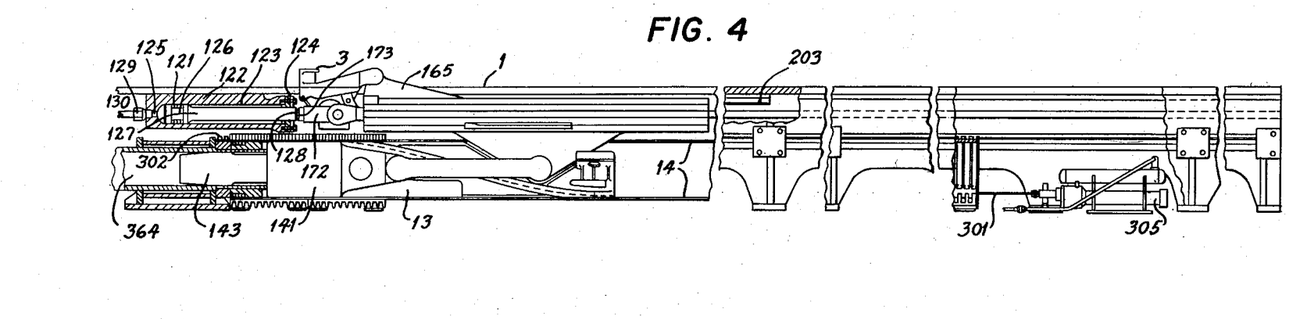
Fig. 4 is a side view partly in elevation and partly in section taken substantially along the center line of Fig. 3.
Figure 22:
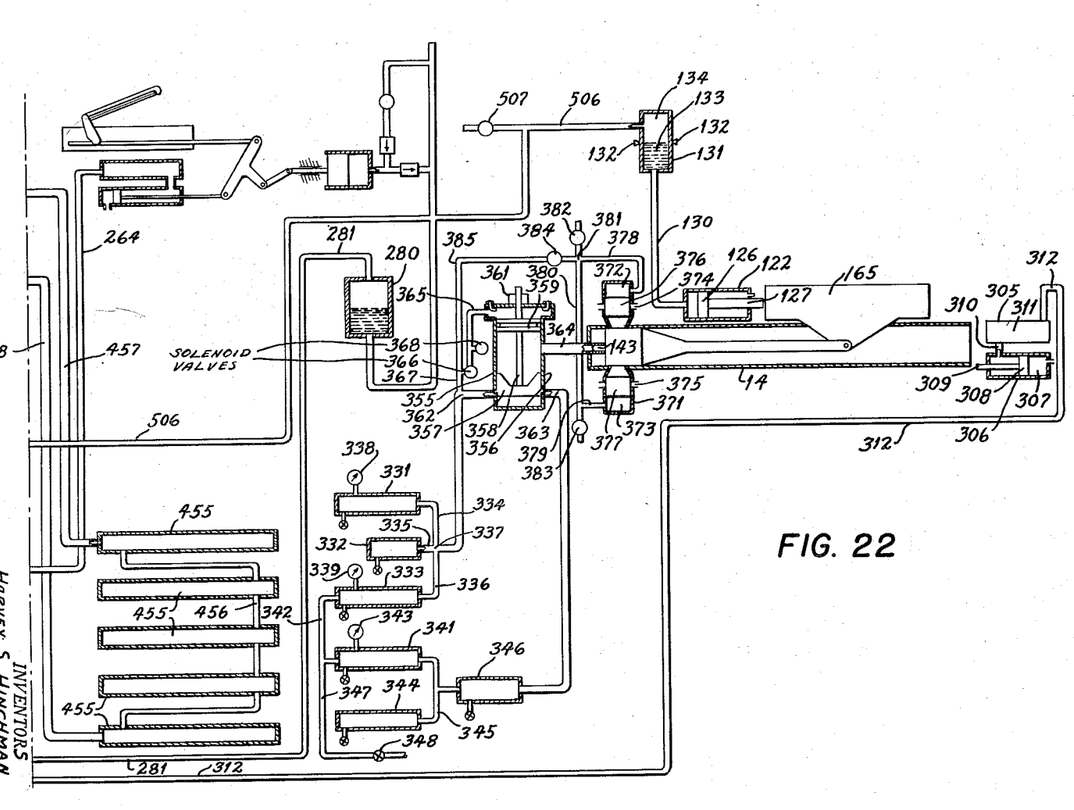
Figs. 22 and 23 together constitute a diagrammatic showing of the fluid-flow arrangement of the catapult.

There is shown in Figs. 4 and 22 a bridle tensioner and retraction buffer 121 comprising a housing 122 having therein a bore 123 extending from one end of housing 122 part way only to the other end of the housing. At the open end of housing 122 there is located a sealing and bearing assembly 124. The other end of housing 122 is provided with a restricted orifice 125. Disposed for sliding movement in bore 123 is a piston 126 having an integral piston rod 127 extending through sealing and bearing assembly 124. The extremity of rod 127 forms an abutment face 128 adapted for abutting contact with abutment face 173 of buffer stud 172 formed on shuttle 165. In fluid communication with restricted orifice 125 is a bored adaptor 129 connected with a fluid pipe 130 the other end of which is in fluid communication with an air-fluid receiver 131 having overflow plugs 132. There is seen in reservoir 131 fluid 133 above which is disposed air 134.

In operation an increase in pressure of air 134 forces fluid 133 against piston 126 to cause piston rod 127 to exert pressure against shuttle abutment stud 172 to move shuttle crosshead 165 to the right as seen in Fig. 4. Such operation is effected to remove slack from the bridle (not shown) connecting hook 3 with the deadload. During the retracting operation shuttle abutment stud 172 abuts against the end of piston rod 127 to move piston 126 to the left as seen in Fig. 4, thereby forcing liquid through restricted orifice 125 and pipe 130 into receiver 131 against compressed air 134.

*Shuttle and piston assembly*

Figure 16:
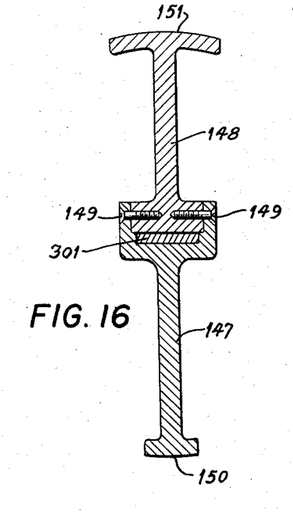

Figs. 3, 4, 14, 15, 17 and 18 show an assembly comprising the shuttle 140, and including the piston 141 provided with piston rings 142 and having an integral tapered metering pin 143 provided with bleed channels 144. Metering pin 143 extends into air pressure pipe 364. Extending away from piston 141 at the end opposite metering pin 143 is shank 145 to the extremity of which is fastened by bolts 146 a lower guide 147 and an upper guide 148 that are fastened together (Fig. 16) by screws 149. The extremity of lower guide 147 forms a wiper face 150 and the extremity of upper guide 148 forms a wiper face 151. Wiper faces 150, 151 are adapted for sliding contact with the inner surface of cylinder 14. The forward extremity of upper guide 148 is formed radially into spiders 152 and 153 (Fig. 5) having wiper faces 154 and 155 adapted for sliding contact with the inner surface of cylinder 14.

Figure 14:
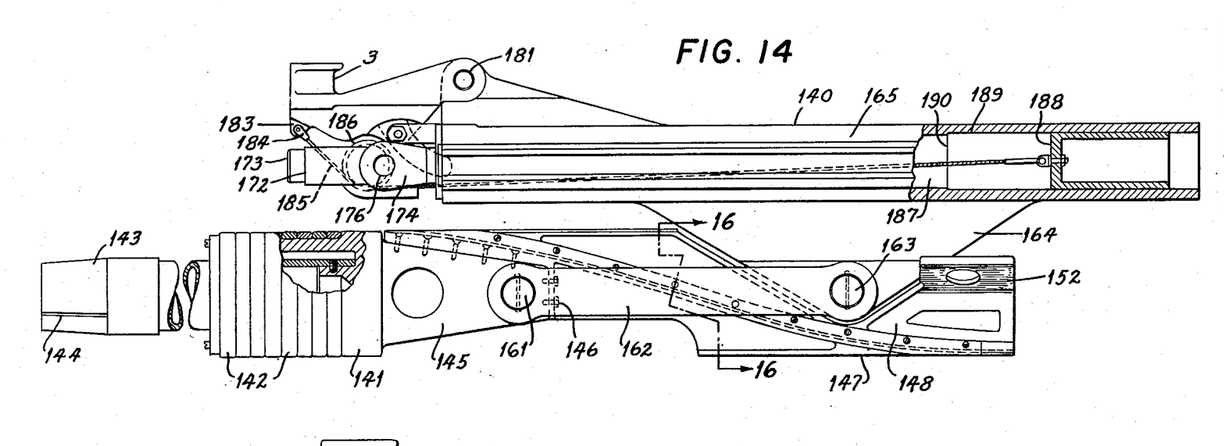
Fig. 14 is a side elevation of the shuttle and piston assembly.
Figure 15:
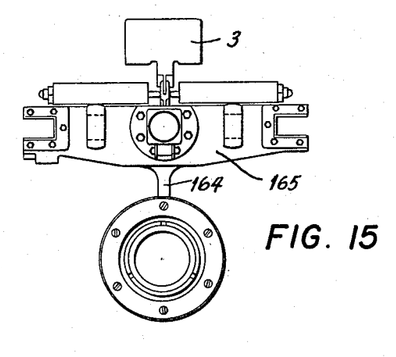

Connected to piston shank 145 by means of wrist pin 161 and extending forwardly therefrom is connecting rod 162 the other extremity of which is connected by a wrist pin 163 with the lower extremity of shuttle web 164. The upper extremity of shuttle web 164 is formed integrally with shuttle crosshead 165 which is formed along opposite sides thereof with lateral guide channels 166, 167, each having a phenolic liner 168, 169 adapted for sliding movement along rails 124a, 123a. Phenolic liners 168, 169 are retained against longitudinal movement in guide channels 166, 167 by retainer plates 170, 171.

Extending rearwardly from shuttle crosshead 165 is fixedly mounted stud 172 having abutment face 173. Also extending rearwardly from shuttle crosshead 165 on opposite sides of buffer stud 172 are eye bolts 174, 174 provided with eye openings 175, 175 through which are adapted to be passed the ends of cables 6 (shown in Fig. 1) that are connected with brake engine 5.

Figure 17:
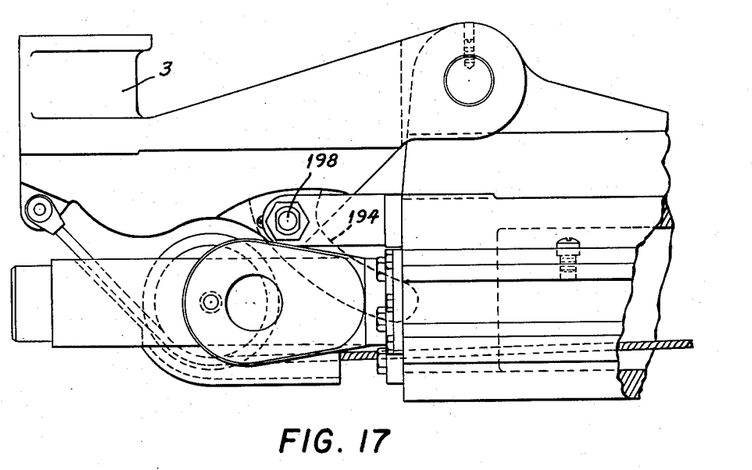
Figure 18:
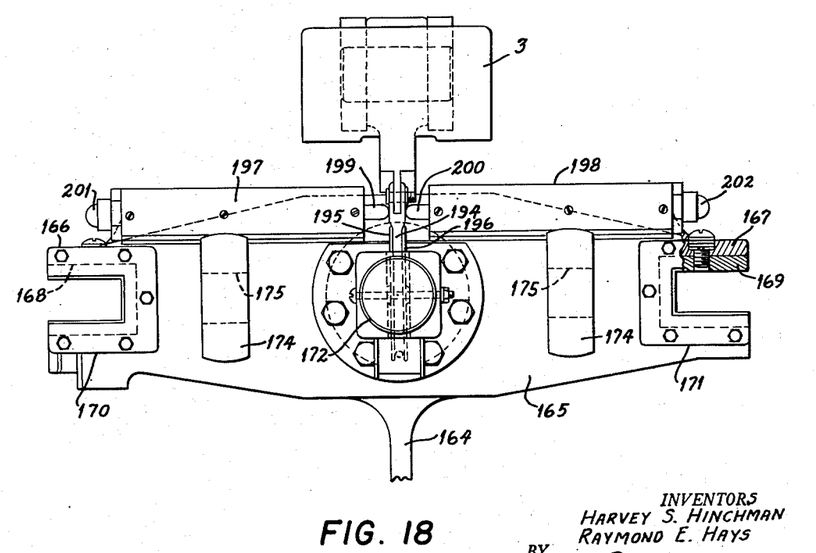
Fig. 18 is a view of the end of the shuttle as viewed from the left of Fig. 17.

Rotatably mounted at the upper rear extremity of shuttle crosshead 165 by means of a pin 181 is a hook 3. Hook 3 is so designed that in the case of a runaway shot, hook 3 will rotate into close position (as shown in Figs. 14, 17) closing the run-away shot preventer circuit described hereinafter.

*Runaway shot preventer*

Secured to ear 183 of hook 3 by a clevis 184 is one end of a cable 185 that passes over sheave 186 rotatably mounted on shuttle crosshead 165. Cable 185 extends through a bore 187 formed in crosshead 165 and extending to the extremity of the crosshead 165. The end of cable 185 remote from clevis 184 is secured to a piston 188 adapted for movement in a bore 189 formed at the forward end of shuttle crosshead 165. Bore 189 is formed to provide a transverse stop shoulder 190 where it joins bore 187. Stop shoulder 190 limits movement of piston 188 in a rearward direction. In operation during the braking stroke, hook 3 is brought down to the deck by piston 188 within shuttle crosshead 165 since inertia causes piston 188 to move to the right as seen in Fig. 14.

Depending from hook 3 is a sector piece 194 formed of electrical conducting material. The lower portion of sector piece 194 is provided on its opposite sides with faceplates 195 and 196 of electrical insulating material. Disposed on opposite sides of sector plate 194 and mounted fixedly upon shuttle crosshead 165 is electric switch assembly 197, 198. Runaway shot preventer switch 197, 198 is provided with electric contact plungers 199, 200 that are resiliently urged toward each other and into contact with sector piece 194 when hook 3 is in retracted position, or in contact with electric insulating face plates 195, 196 when hook 3 is in extended position. Plungers 199, 200 are connected with cam pins 201, 202 respectively that extend outwardly from switch 197 and that are adapted to contact the shuttle switch rails 203 (Fig. 4). When hook 3 is in extended position the run-away shot preventer circuit is open, but in case of a run-away shot, hook 3 under the influence of inertia will rotate into retracted position to close the run-away shot-preventer circuit.

*Holdback and release mechanism*

Figure 19:
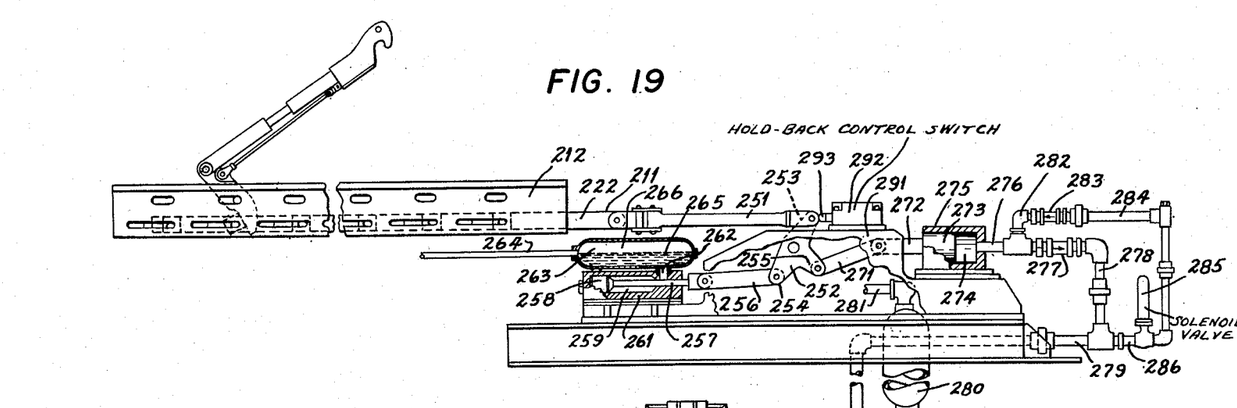
Fig. 19 is a view showing the holdback and release installation.
Figure 20:
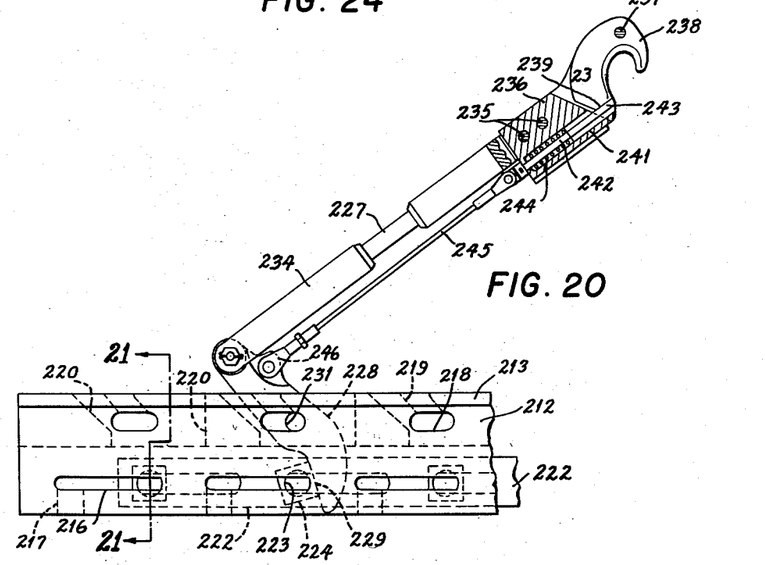
Figure 21:
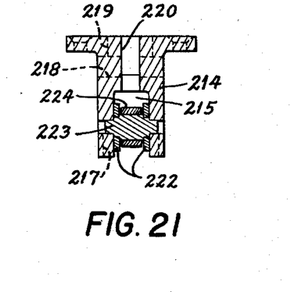
Fig. 21 is a sectional view taken substantially along line 21—21 of Fig. 20.

There is seen in Figs. 19, 20 and 21 a holdback and release mechanism 211 including a cleat 212 having horizontal flanges 213 adapted to be mounted flush with deck plates 1, and a dependent vertical body portion 214 that is formed at its lowest extremity with an internal channel 215 that extends throughout its length. There are provided a series of slots 216 with access slots 217 in communication therewith. The upper portion of cleat 212 is provided with a second series of slots 218 with access slots 219 in communication therewith. Cleat 212 in the upper portion thereof is provided with a series of channels 220 that extend downwardly into communication with channel 215.

Disposed for sliding movement in channel 215 is a bar 222 having mounted thereon at intervals a series of pins 223 upon which are rotatably mounted blocks 224.

In assembling bar 222, within channel 215, pins 223 are moved through access slots 217 of cleat 212 and into elongated slots 216.

Assembled with respect to cleat 212 is a hook assembly 227 including a link 228 having a contact toe 229 adapted to abut one face of a selected block 224. Mounted on link 228 and extending laterally therefrom are trunnions 231 that extend into slots 218. In assembling link 228 within channel 220, and with toe 229 extending into contact with a selected block 224, trunnions 231 are passed through access slots 219 of cleat 212 and into slots 218.

Rotatably mounted at the upper end of link 228 is one end of another link 234, the other end of which is fixedly fastened by pins 235 to a body member 236. The extremity of body 236 is provided with a pin 237 upon which is rotatably mounted a hook 238 having a latch face 239. Disposed for reciprocation in bore 241 of body 236 is a plunger 242, the extremity of which forms a latch 243 for movement into and out of engagement with latch face 239 of hook 238. A spring 244 resiliently urges latch 243 toward the right, as seen in Fig. 20. Fastened to the extremity of plunger 242, remote from latch 243, is one end of a cable 245, the other end of which is attached to ear 246 formed on link 228.

In operation, the airplane or other dead load is fastened to the extremity of hook 238 and exerts a force toward the right, as seen in Fig. 20. As hook 238 is moved toward the right, under such force, link 228 rotates in a clock-wise direction about trunnions 231 so that the angle between link 234 and link 228 is gradually opened with the result that cable 245 gradually moves plunger 242 to the left, as seen in Fig. 20 to move latch 243 out of engagement with latch face 239 of hook 238. When hook 238 is moved approximately four inches to the right, latch 243 is completely withdrawn from engagement with latch face 239 of hook 238, whereby hook 238 moves in a counterclockwise direction about pin 237 to release the airplane or other dead load.

Fastened to the extremity of bar 222 is one end of a link 251, the other end of which is fastened to arm 253 of bellcrank 252 having additional arms 254 and 255. Arm 254 is connected by a link 256 to one end of a piston rod 257 at the other end extremity of which is a piston 258 adapted for movement in bore 259 of a housing 261. Bore 259 is connected by a conduit 262 with a retracting cylinder 263 connected with a conduit 264. Within retracting cylinder 263 is disposed an oil reservoir 265 above which is disposed compressed air 266.

Bellcrank arm 255 is connected to one end of a link 271, the other end of which is connected to a piston rod 272 provided with a piston 273 adapted for movement in bore 274 of holdback cylinder 275. Bellcrank arm 255 and link 271 thus form a toggle joint. A pipe 276 connects holdback cylinder 275 through a check valve 277 and pipe 278 to a pipe 279 connected with the lower end of accumulator 280, the lower portion of which is provided with an oil reservoir (not shown), the space above the oil being filled with compressed air. A pipe 281 is connected with the upper end of accumulator 280. Connected to pipe 276 is a bypass pipe 282 that is connected through a check valve 283 and through pipe 284 to a solenoid valve 285. Pipe 286 connects solenoid valve 285 with accumulator pipe 279. Fixedly mounted on housing 291 is a switch 292 having a movable plunger 293 adapted to be resiliently urged into contact with bellcrank arm 253.

Operation is as follows: In the battery position pressure is admitted to holdback cylinder 275 from accumulator 280 through solenoid valve 285 that is normally open. Retracting cylinder 263 is under pressure at all times. Switch 292 is held closed by bellcrank arm 253. Upon firing, solenoid valve 285 is closed allowing the fluid to be forced out of holdback cylinder 275 through check valve 277 to accumulator 280. When holdback and release assembly 227 move about four inches, the holdback force is reduced to zero because toggle joint 255, 271 is opened. The pressure in retracting cylinder 262 is insufficient to hold back the airplane or dead load, and the switch 292 by motion of the link mechanism 271, 252, 256 is allowed to open. When the airplane or dead load is released, the pressure in the retracting cylinder 263 returns the link mechanism 271, 252, 256 to battery position. At the same time bellcrank 252 closes switch 292. When the shuttle cam (to be described) is cut off solenoid valve 285 opens and fluid under pressure again acts to hold back cylinder piston 273.

*Sealing strip and tensioner*

Figure 3:
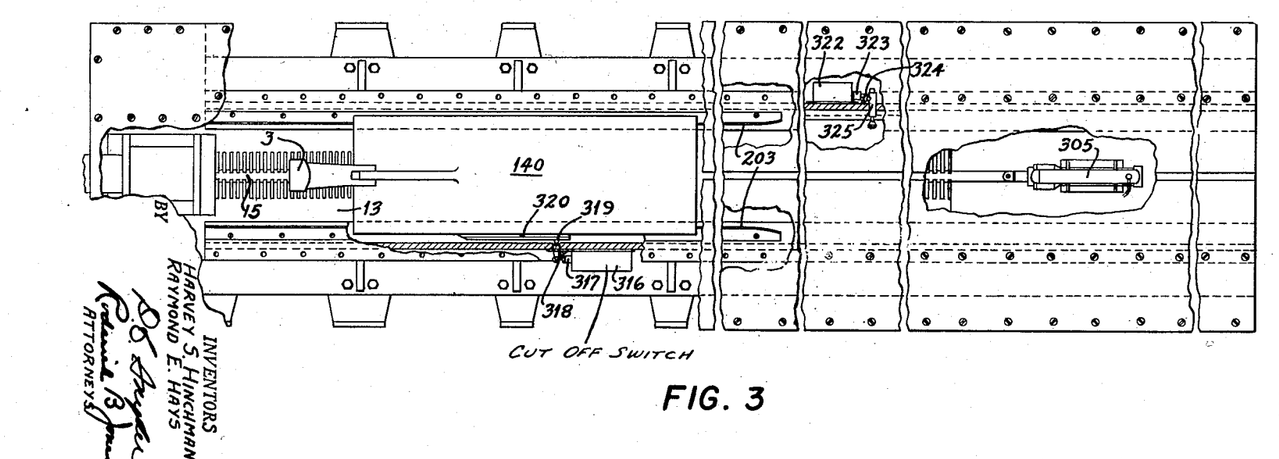
Fig. 3 is a top plan view with parts broken away for clarity, of the launching engine installation.

Seen in Figs. 3 and 4 is a sealing strip 301 that is fastened at the piston end of the launching engine by bolts 302. The sealing strip is guided from top to bottom of cylinder 14 by lower guide 147 and upper guide 148 of piston 141. There is provided a space between lower guide 147 and upper guide 148 (Fig. 16) and through this space strip 301 is adapted to pass as piston 141 moves within cylinder 14.

At the brake end the sealing strip 301 is connected with strip tensioner 305 (Fig. 22) comprising a cylinder 306 having a bore 307 within which is adapted to move a piston 308 having a piston rod 309 that is connected to sealing strip 301. Bore 307 is connected by pipe 310 with an air-fluid reservoir 311 adapted to have fluid therein with an air space above the fluid. Reservoir 311 is connected by pipe 312 to a source of compressed air.

In operation when the firing circuit is energized and the piston 141 is accelerated along the launching engine cylinder 14, the sealing strip 301 is held at the top of the slotted cylinder 14 by air under pressure. The strip held in this position will permit a minimum of leakage to atmosphere. At the end of the accelerated run, the piston uncovers a series of holes 18 in the wall of cylinder 14 and the air under pressure is exhaused to the atmosphere. While the sealing strip loses its sealing capacity, it is still being held taut by a strip tensioner 305.

*Battery cutoff switch and air pressure cutoff switch*

Shown in Fig. 3 is a battery cutoff switch 316 having an actuating plunger 317. Plunger 317 is operated by a linkage 318 having a cam plunger 319 that is actuated by cam plate 320 mounted on shuttle 140. If shuttle 140, during bridle tensioning, moves more than fifteen inches from full battery position, the battery cutoff switch 316 will open thus breaking the circuit and opening the bridle tensioner's solenoid valve.

Also shown in Fig. 3 is an air pressure cutoff switch 322 having an actuating plunger 323. Plunger 323 is operated by a linkage mechanism 324 and a cam plunger 325 that is actuated by shuttle 140. After the assembly of shuttle 140 and piston 141 travels approximately three-quarters of the length of its power run, shuttle 140 cams cutoff switch 322 open, thus shutting off air pressure to the launching engine cylinder 14.

*Fluid flow arrangement for catapult engine*

Figure 23:
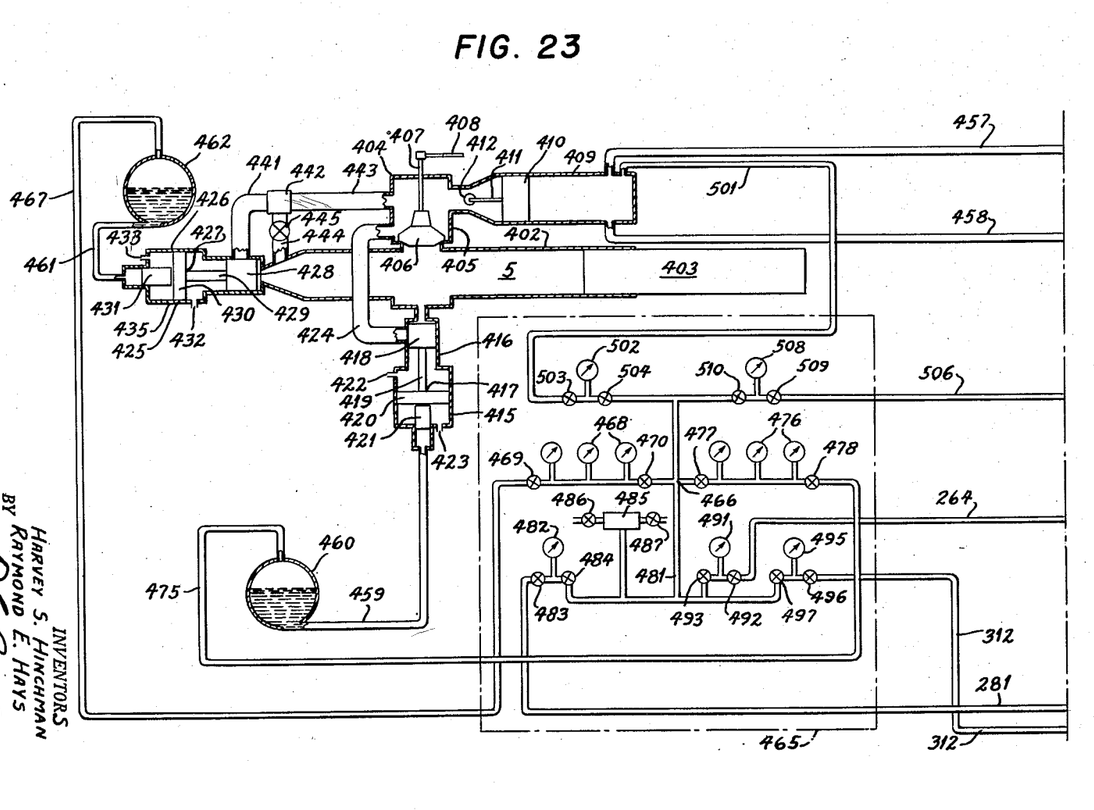

Shown in Figs. 22 and 23 is a diagrammatic arrangement of fluid flow in the catapult. The air accumulator system for cylinder 14 comprises tanks 331, 332, and 333 connected by pipes 334, 335 and 336 to a coupling 337. Tanks 331 and 333 are provided with pressure gauges 338 and 339. A tank 341 is connected by pipe 342 to tank 333 and is provided with a pressure gauge 343. A tank 344 is connected by pipe 345 to tank 341 and also to tank 346. A pipe 347 connects pipe 342 to a suitable source of high pressure air and is provided with a charging valve 348.

*Piston valve*

There is shown in Fig. 22 the piston valve 355 for controlling directly the admission of air to catapult engine 13. Piston valve 355 comprising a cylinder 356 having therein a piston head 357 mounted on a piston rod 358 provided with a second piston head 359. Piston rod 358 extends beyond piston head 359 and through cylinder 356 externally thereof where it is provided with a lock nut 361 that is used to prevent operation of piston valve 355. With lock nut 361 removed piston valve can operate. Cylinder 356 at the end adjacent pison head 357 is connected by pipes 362 and 363 with accumulator coupling 337 and accumulator tank 346, respectively. Cylinder 356 between cylinder heads 357 and 359 is connected by a pipe 364 with the battery end of cylinder 14. Cylinder 356 at the end adjacent piston head 359 is connected by a pipe 365 through a solenoid valve 366 (normally closed) to a pipe 367 that is in turn connected to accumulator coupling 337. Pipe 365 between cylinder 356 and valve 366 is connected to solenoid valve 368 (normally open).

In operation piston valve 355 opens to admit air under pressure from accumulator coupling 337 and accumulator tank 346 into catapult engine 13; piston valve 355 closes to block the air pressure. When the firing circuit is energized, solenoid valves 366 and 368 reverse their normal positions and allow air under pressure from accumulator coupling 337 to be exerted on the fluid in cylinder 356 in the space between piston head 359 and the end of cylinder 356. Piston valve 355 is forced open and admits air from accumulator coupling 337 and accumulator tank 346 into cylinder 356 and through pipe 364 into launching engine cylinder 14 to accelerate the piston and shuttle assembly 140 and connected loads along cylinder 14. After the piston and shuttle assembly 140 travels approximately three-quarters the length of the power run, shuttle 140 cams cutoff switch 322 open returning the firing solenoid valves 366 and 368 to their normal deenergized positions whereby the piston valve 355 closes shutting off air pressures to catapult cylinder engine 14.

*Runaway shot preventer*

There is shown in Fig. 22 a runaway shot preventer 371 at the piston valve end of catapult engine 13. The runaway shot preventer 371 comprises two cylinders 372 and 373 on opposite side catapult engine cylinder 14 and in fluid communication therewith. Cylinders 372 and 373 are provided with atmospheric ports 374 and 375 that under normal conditions are closed by pistons 376 and 377 as seen in Fig. 22. Cylinders 372 and 373 are connected by pipes 378 and 379 to a cross pipe 380 providing a coupling 381. Coupling 381 is connected to a solenoid valve 382 (normally closed) and pipe 379 is connected to a solenoid valve 383 (normally closed). Coupling 381 is connected to a solenoid valve 384 (normally open) and a pipe 385 to pipe 367.

In operation runaway shot preventer 371 provides a means for exhausting to atmosphere the launching pressure in the catapult engine cylinder 14 in case of a runaway shot. In the event of a runaway shot, switches 197 and 198 close and thereby close the piston valve 355. Under these conditions solenoid valve 384 is closed and solenoid valves 382 and 383 are open blocking air under pressure from accumulator coupling 337 and accumulator tank 346 and exhausting air under pressure behind runaway shot preventer pistons 376 and 377. The catapult engine pressure in cylinder 14 forces the runaway shot preventer pistons 376 and 377 into open position and the air under pressure in cylinder 14 is exhausted to atmosphere through atmospheric ports 374 and 375.

*Braking and retraction engine*

In Fig. 23 there is shown a braking and retraction engine 5 comprising a cylinder 402 having a ram 403 adapted for sliding movement therein. Ram 403 is connected by cables 6 (Fig. 1) passing around sheaves 7 to hook 3 of catapult engine 13. Cylinder 402 is provided at one side with a check valve 404 comprising a cylinder 405 in fluid communication therewith. Seating in cylinder 405 is a valve disk 406 actuated by a valve stem 407 and crank handle 408. One side of valve cylinder 405 is in fluid communication with an accumulator housing 409 having piston 410 adapted for movement therein. Disk 410 is provided with an indicating stem 411 adapted in battery position to project in front of an inspection hole 412 provided in accumulator housing 409. Cylinder 402 opposite check valve 404 is provided with an auxiliary control valve 415 comprising a housing 416 in fluid communication therewith. Disposed for movement in housing 416 is piston 417 having a piston head 418 connected by a piston rod 419 to a piston head 420. A slug 421 extends beyond piston head 420 into the end of valve housing 416. Bleed ports 422 and 423 are provided in housing 416 to prevent air locks. A pipe 424 connects auxiliary control valve housing 416 with check valve 405.

In fluid communication with the end of brake cylinder 402 is a main control valve 425 comprising a valve housing 426 in fluid communication therewith. Disposed for movement in housing 426 is piston 427 having a piston head 428 connected by a piston rod 429 to a piston head 430. A slug 431 extends beyond piston head 430 into the end of valve housing 426. Bleed ports 432 and 433 are provided in housing 426 to prevent air locks.

Main control valve housing 426 is connected by pipe 441 with a coupling 442 through a pipe 443 to check valve housing 405. The end of cylinder 402 adjacent main control valve 425 is connected by a pipe 444 through a limited lift valve 445 to coupling 442.

In operation the main control valve 425 acts as an energy absorbing device and a constant pressure valve during the brake stroke of an airplane or dead load launching. When the braking and retraction engine ram 403 moves into the engine cylinder 402 and passes over the port to check valve 405, the pressure in the cylinder 402 causes the main control valve 425 to open. This allows the fluid of engine cylinder 402 to pass consecutively through the main control valve 425 and check valve 404 into the braking and retraction engine accumulator 409.

When the braking and retraction engine 5 is acting as an energy absorbing device and the catapult is firing without a load on the shuttle 140, both the main control valve 425 and the auxiliary control valve 415 act as energy absorbing devices and constant pressure valves. During the launching stroke, with the check valve 404 locked closed, either or both the main control valve 425 and the auxiliary control valve 415 will open and allow the fluid of engine cylinder 402 to pass consecutively through the control valve or valves and the check valve 404 into the braking and retraction accumulator 409. When the control valve or valves and the check valve 404 into the braking and retraction accumulator 409. When the engine cylinder ram 403 passes over the port to check valve 405 the pressure in the cylinder 402 causes the main control valve 425 to open. The fluid in engine cylinder 402 will reach the braking and retraction engine accumulator 409 as described previously.

The purpose of check valve 404 is to allow the catapult to be used either for launching airplanes and dead loads or for launching the catapult without any loads connected to the shuttle 140. For launching an airplane or deadload the check valve stem 407 is raised by crank handle 408 so that the check valve disk 406 will open under fluid flow from the braking and retraction engine cylinder 402, during the power run. For launchings made using the braking and retraction engine 5 to absorb the launching energy in place of a deadload or airplane, the check valve 404 is locked closed.

The limited lift valve 445 provides a means for retracting the catapult mechanism. During the launching cycle, the limited lift valve 445 is locked closed. In order to retract the catapult mechanism, it is necessary to allow air under pressure in the braking and retraction engine accumulator 409 to push the accumulator piston 410 and force fluid against the ram 403 of the braking and retraction engine 5. This is accomplished by manually raising the level of the limited lift valve 445.

*Fluid flow arrangement for braking and retracting engine*

Shown in Figs. 22 and 23 is a diagrammatic arrangement of fluid flow for the braking and retraction engine 5. There are shown a plurality of air flasks 455 that are connected together by piping 456. Air flasks 455 are connected by pipe 457 and 458 to braking and retraction engine accumulator 409. The end of auxiliary control valve housing 416 remote from braking cylinder 402 is connected by a pipe 459 with an accumulator cylinder 460. The end of main control valve housing 426 remote from braking cylinder 402 is connected by a pipe 461 with accumulator cylinder 462.

As seen in Fig. 23 there is provided a control panel 465 having a central coupling 466. Main control valve accumulator 462 is connected by a pipe 467 to central coupling 466. Mounted on pipe 467 are pressure gauges 468 for indicating pressure at the main control valve 425. Gauge valve 469 and regulating valve 470 are provided in pipe 467 adjacent pressure gauges 468. Auxiliary control valve accumulator 460 is connected by a pipe 475 with circular coupling 466. Mounted on pipe 465 are pressure gauges 476 for indicating pressure at the auxiliary control valve. Regulating valve 477 and gauge valve 478 are provided in pipe 475 adjacent gauges 476.

Holdback and release accumulator 280 is connected by pipe 281 and pipe 481 with central coupling 466. Mounted on pipe 281 is a pressure gauge 482 for indicating operating pressure in the holdback cylinder 274. Gauge valve 483 and regulating valve 484 are provided in pipe 281 adjacent pressure gauge 482. Mounted on pipe 281 between regulating valve 484 and pipe 481 is an air supply 485 together with an air charging valve 486 and a blow-off valve 487.

Pipe 264 from holdback and release retracting cylinder 263 is connected to central coupling 466. Mounted on pipe 264 is a pressure gauge 491 for indicating retracting pressure in the holdback and release retracting cylinder 263. A gauge valve 492 and a regulating valve 493 are mounted on pipe 264 adjacent gauge 491.

Pipe 312 from strip tensioner 315 is connected to central coupling 466. Mounted on pipe 312 is a pressure gauge 495 for indicating pressure at strip tensioner 305. Gauge valve 496 and regulating valve 497 are provided on pipe 312 adjacent gauge 495. Retracting brake engine accumulator 409 is connected by a pipe 501 with central coupling 466. Mounted on pipe 501 is a pressure gauge 502 for indicating pressure in the braking and retraction accumulator 409. Gauge valve 503 and regulating valve 504 are provided on pipe 501 adjacent pipe 502. Bridle tension receiver 131 is connected by a pipe 506 with central coupling 466. Pipe 506 has mounted thereon a solenoid valve 507 that is normally open. Mounted on pipe 506 is a pressure gauge 508 for indicating pressure at the bridle tension receiver 131. Gauge valve 509 and regulating valve 510 are mounted on pipe 506 adjacent gauge 508.

*Signal system*

Figure 24:
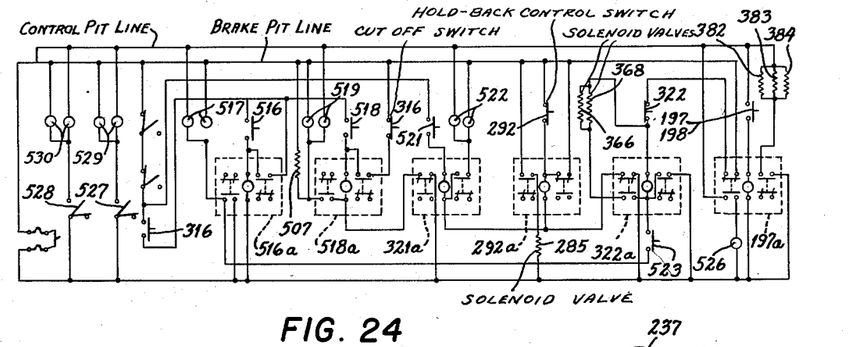
Fig. 24 is a schematic view of the electric signal system of the catapult.

The signal system provides a means, with interlocking relays and colored lights, whereby operating signals may be transmitted between the controls and the catapult operators, assuring that the operation of the catapult will not deviate from the firing sequence described in the following paragraphs. Momentary-contact push-button stations mounted on the control and brake-pit panels and limit switches, at various points of the catapult, energize holding relays which close to maintain the circuit. The signal system is shown in Fig. 24.

When the operator is ready for a launching cycle, normally, the operator at the brake-pit panel indicates his readiness by depressing the catapult-ready switch 516. This illuminates the white lights 517 on both the control and brake pit panels Next, the bridle tensioner switch 518 is depressed at the control pit panel, the green lights 519 on the control and brake pit panels are illuminated and the normally open solenoid valve 507 closes. If the shuttle 140, during bridle tensioning, moves more than fifteen inches from full battery position, the shuttle switch 316 will open, thus breaking the circuit and blanking the catapult ready 517 and bridle tensioner signal lights 519 and opening the bridle tensioner solenoid valve 507.

In order to repeat bridle tensioning, the shuttle 140 must be retracted to full battery position. The retracting switch 521 located on the control pit panel, is depressed and the yellow lights 522 on both the control and brake pit panels are illuminated. The yellow lights 522 remain illuminated only so long as the retracting switch 521 is held depressed. The yellow light 522 on the brake pit panel indicates to the catapult operator that the limited lift valve 445 must be opened to retract the catapult. When the operator at the control pit panel observes the shuttle retracting, he removes his hand from the retracting switch 521 and blanks the retracting signal lights 522. Bridle tensioning can then be reaccomplished.

After bridle tensioning has been properly accomplished, the firing switch 523, located on the control pit panel, can be depressed, and the two firing solenoid valves 366, 368, one normally open and the other normally closed, are energized firing the catapult. At the same time, the normally open holdback and release solenoid valve 285 is energized, shutting off the pressure from the holdback and release air-fluid accumulator 280 to the holdback cylinder 275.

As the holdback and release mechanism 211 operates to release the airplane or deadload, the bellcrank 252 of the holdback and release 211 moves away from the holdback and release switch 292, allowing the switch 292 to open thus preventing the opening of the holdback and release solenoid valve 285. When the airplane or deadload is released, the holdback and release 211 returns to the battery position. The holdback and release switch 292 is depressed again by the bellcrank 252 and closed, and when cutoff has been accomplished, the holdback and release solenoid valve 285 will open.

At a travel of approximately three-quarters of the accelerated run, the shuttle 140 opens the cutoff switch 322 and de-energizes the firing solenoid valves 366, 368 allowing the piston valve 355 to close. This, also, closes the holdback and release circuit, allowing the holdback and release solenoid valve 285 to open. If there is a runway shot, the switch 197, 198 in the shuttle 140 closes, which, in turn, de-energizes the firing circuit and closes the piston valve 355. At the same time, the blue runaway shot signal light 526 on the control pit panel is illuminated and the runaway shot preventer normally open 384 and normally closed 382, 383 solenoid valves are energized, allowing the runaway shot preventer cylinder 371, 372 to exhaust the launching engine cylinder 14.

If, at any time before the firing switch 523 is depressed, the catapult operators have reason to suspend operations, the operators at the control and brake pit panels will throw the suspension switch 527, 528 on the respective panels. Each switch thrown will illuminate suspension lights 529, 530 on both the control and brake pit panels and prevent any further operation of the catapult.

The firing circuit cannot be energized until the catapult ready switch 516 is depressed. Switches 516, 518, 521, 292, 322 and 197 operate through contact relays 516a, 518a, 521a, 292a, 322a, and 197a.

*Operation of the catapult*

A deadload shot is made as follows:

In the braking and retracting engine compartment—

The main constant pressure valve 425 and the launching accumulator 331, 332, 333, 341, 344, 346 air pressure are determined and adjusted.

A quick check is made to make certain that the limited lift valve 445 on the braking and retracting engine cylinder 402 is locked closed.

Another check is made to make certain that the indicator rod 411 of the braking and retracting engine accumulator piston 410 can be viewed through the sight glasses 412 and within the circle of them in the accumulator wall 409.

The brake engine accumulators 460, 462, the auxiliary constant pressure valves 415, the holdback and release operating, the holdback and release retracting and the strip tensioner pressures are checked for correctness as previously set.

The check valve stem 407 is observed to be raised for the deadload shot.

When the equipment in the brake pit is in readiness for a launching cycle, the brake pit panel operator depresses the catapult ready button 516 illuminating the catapult ready signals 517 (white lights) on both the control and brake pit panels.

When the brake pit panel operator observes the illuminating of the bridle tension signal 519 (green light) on the panel, he closes the blow-off valve 487 and opens the air charging 486 and the regulating valve 510 between the bridle tensioner pressure gage 508 and the air supply line. When the correct pressure is reached, and the blowoff valve 489 is opened both valves are closed. Bridle tensioning is accomplished independently of the catapult ready signal 517. The bridle tensioner piston rod 127 is forced against the shuttle 140 and tensions the towing bridle or pendant.

After the catapult ready signal 517 is received on deck and bridle tensioning is accomplished, the control pit panel operator makes certain that the deck launching area is clear and that all personnel in the brake pit and arresting gear pit are above deck.

To effect launching of the deadload, the control pit panel operator assures himself that the brake pit, arresting gear pit, and the deck launching area are clear of personnel, he depresses the firing button 523 energizing the firing circuit. The catapult ready 517 and the bridle tensioner lights 219 are extinguished.

In a distance of approximately four inches, the unloading element 238 of the holdback and release airplane assembly 227 releases the deadload and allows it to be towed along the deck. The holdback and release airplane assembly 227 remains with the cleat assembly 212.

Once the deadload is free to be towed along the deck, the holdback and release mechanism 211 automatically returns to the battery position.

To effect retraction of the deadload, the control-pit-panel operator depresses the retracting button 521, illuminating the retracting signals 522 (yellow lights) on both the control and brake pit panels. The yellow lights 522 are illuminated only when the retracting button 521 is held depressed. The retracting cycle is accomplished by unlocking the limited lift valve 445 and raising the limited lift lever manually. The bridle tensioner 121 acts as a retraction buffer at the end of the retraction cycle.

An airplane shot is made as follows:

Preparations for an airplane shot, launching and retraction are the same as for a deadload shot except that the airplane weight is fixed instead of adjustable by weight increment and that the towing bridle or pendant is separate from the airplane instead of being permanently attached.

A shot without shuttle-connected loads is made as follows:

Preparation for a launching cycle without any loads connected to the shuttle 140 are made simultaneously on the flight deck and in the brake pit.

In the braking and retracting engine compartment, the main 425 and auxiliary 415 constant pressure valves and the launching accumulator 331, 332, 333, 341, 344, 346 air pressures are determined and adjusted.

A quick check is made to make certain that the limited lift valve 445 on the braking and retracting engine cylinder 402 is locked closed.

Another check is made to make certain that the indicator rod 411 of the braking and retracting engine accumulator piston 410 can be viewed through the sight glasses 412 and within the circle of them in the accumulator wall. The brake engine accumulators 460, 462, the holdback and release operating, the holdback and release retracting and the strip tensioner pressures are checked for correctness as previously set.

The check valve stem 407 is observed to be lowered for the launching cycle without any shuttle connected loads.

When the equipment in the brake pit is in readiness for a launching cycle, the brake pit panel operator depresses the catapult ready button 516 illuminating the catapult ready signals 517 (white lights) on both the control and brake pit panels. When the brake-pit-panel operator observes the illuminating of the bridle tension signal 519 (green light) on the panel, he closes the blowoff valve 487 and opens the air charging 486 and the regulating valve 510 between the bridle tensioner pressure gage 508 and the air supply line. When the correct pressure is reached, and the blowoff valve 486 is opened both valves are closed. Bridle tensioning is accomplished independently of the catapult ready signal 517. The bridle tensioner piston rod 127 is forced against the shuttle 140 and tensions the towing bridle or pendant. After the catapult ready signal 517 is received on deck and bridle tensioning is accomplished, the control-pit-panel operator makes certain that the deck launching area is clear and that all personnel in the brake pit and arresting-gear pit are above deck.

To effect launching without shuttle-connected loads, when the control-pit panel operator assures himself that the brake pit, arresting gear pit, and the deck launching area are clear of personnel, he depresses the firing button 523 energizing the firing circuit. The catapult ready 517 and the bridle tensioner lights 519 are extinguished.

Retraction is the same as with a deadload shot.

Obviously many modifications and variations of the present invention are possible in the light of the above teachings. It is therefore to be understood that within the scope of the appended claims the invention may be practiced otherwise than as specifically described.

We claim:

1. A catapult comprising a launching engine, a braking and retraction engine, and means interconnecting said engines for operation together; said launching engine including a substantially horizontal cylinder having a longitudinal slot along the top thereof, said cylinder having a battery end and an exhaust end formed with exhaust holes, peripheral links having a slot in registration with the cylinder slot, a piston in said cylinder, a shuttle external of said cylinder and having a web connected to said piston and extending through said slots, said shuttle having means for fastening to a load to be catapulted, an accumulator for storing compressed fluid, a connecting line from said accumulator to the battery end of said cylinder, a fluid valve in said line, a runaway-shot preventer comprising a normally-closed exhaust valve in the battery end of said cylinder together with an inertia switch on said shuttle and means connecting the inertia switch and exhaust valve and fluid valve to open said exhaust valve and close said fluid valve under runaway shot conditions, a sealing strip in said cylinder adapted to rest by gravity in the cylinder bottom, means for fastening the battery end of said strip to the top of the cylinder, means adjacent the bottom of the cylinder at the battery end for yieldingly holding the other end of the strip to tension the strip, means on said piston for guiding said strip from the bottom of the cylinder into sealing engagement at the cylinder slot where said strip is retained by fluid pressure, a holdback and release toggle joint and means connecting one of the toggle arms with the load so that increased load tends to straighten the joint and means connecting the other of the arms with an element that yieldingly opposes straightening of the joint, and a fluid ram abutting the shuttle in battery position to tension the load and serving as a fluid buffer for the shuttle at the end of a retraction stroke.

2. A catapult comprising a launching engine including a cylinder having a longitudinal slot along the top thereof, a piston in said cylinder actuated by fluid pressure, a shuttle external of said cylinder and having a web connected to said piston and extending through said slot, a sealing strip in said cylinder adapted to rest in the cylinder bottom, means fastening an end of the strip to the top of the cylinder beyond the end of the slot where the piston begins its movement under fluid pressure, means adjacent the bottom of the cylinder at the exhaust end for yieldingly holding the other end of the strip to tension the strip and means on said piston for guiding said strip from the bottom of the cylinder into sealing engagement at the cylinder slot when said strip is retained by fluid pressure.

3. A catapult comprising a launching engine including a cylinder, said cylinder having a battery end and an exhaust end formed with exhaust holes, an accumulator for storing compressed fluid, a connecting line from said accumulator to the battery end of said cylinder, a piston valve in said line, control means including a cutoff switch operated by said shuttle to close said piston valve, a runaway shot preventer comprising normally-closed port means in the battery end of said cylinder, and control means including an inertia switch on said shuttle, and means connecting the inertia switch and port means and piston valve to permit to open said port means and to close said piston valve when said inertia switch is actuated under runaway shot conditions.

4. A catapult comprising a launching engine including a cylinder having a longitudinal slot along the top thereof, a piston in said cylinder, a shuttle external of said cylinder and having a web connected to said piston and extending through said slot, said shuttle having bridle means for fastening to a load to be catapulted, a bridle-tensioner comprising a fluid ram that abuts against the shuttle when it is positioned for a launching operation, and operating to tension the load and to serve as a fluid buffer for the shuttle at the end of the retraction stroke, and control means including a switch operated by said shuttle for de-energizing said ram and a switch for energizing said ram.

References Cited in the file of this patent

UNITED STATES PATENTS

| 2,207,806 | Hollmann | July 16, 1940 |
| 2,235,070 | Giern et al. | Mar. 18, 1941 |
| 2,424,800 | Coverley et al. | July 29, 1947 |
| 2,497,916 | Stambaugh | Feb. 21, 1950 |

FOREIGN PATENTS

| 583,122 | Great Britain | Dec. 10, 1946 |